(12) United States Patent
Fadel

(10) Patent No.: US 11,076,538 B2
(45) Date of Patent: Aug. 3, 2021

(54) HYDROPONIC TURFGRASS ATHLETIC FIELD AND LANDSCAPE APPARATUS

(71) Applicant: United Arab Emirates University, Al Ain (AE)

(72) Inventor: Moustafa Amin Fadel, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 16/274,583

(22) Filed: Feb. 13, 2019

(65) Prior Publication Data

US 2020/0253132 A1 Aug. 13, 2020

(51) Int. Cl.
*A01G 9/033* (2018.01)
*A01G 31/02* (2006.01)
*C02F 1/32* (2006.01)
*A01G 25/16* (2006.01)
*A01G 20/10* (2018.01)

(52) U.S. Cl.
CPC ............ *A01G 9/033* (2018.02); *A01G 20/10* (2018.02); *A01G 25/16* (2013.01); *A01G 31/02* (2013.01); *C02F 1/32* (2013.01)

(58) Field of Classification Search
CPC ..... A01G 25/06; E04F 15/225; E01C 13/045; E04B 1/92; E04B 5/43; B32B 3/28; B32B 27/08; B32B 27/14
USPC ....... 47/65.9; 52/403.1, 789.1, 480; 267/144
See application file for complete search history.

(56) References Cited

U.S. PATENT DOCUMENTS

| | | | | |
|---|---|---|---|---|
| 2,364,395 A | * | 12/1944 | Sims | E04B 1/0007 109/81 |
| 3,812,636 A | * | 5/1974 | Albrecht | E04D 3/30 52/334 |
| 3,863,388 A | * | 2/1975 | Loads | A01G 20/00 47/56 |
| 4,023,506 A | * | 5/1977 | Robey | E01C 13/083 47/58.1 R |
| 5,507,845 A | * | 4/1996 | Molnar | A01G 20/20 47/1.01 R |
| 6,081,955 A | * | 7/2000 | Dumlao | B63B 5/24 14/73 |

(Continued)

FOREIGN PATENT DOCUMENTS

FR 2620469 A1 * 3/1989 ............ A01G 25/06

*Primary Examiner* — Ebony E Evans
(74) *Attorney, Agent, or Firm* — Hayes Soloway PC

(57) ABSTRACT

The present invention discloses a hydroponic field irrigation system comprising a field module for growing turfgrass. The field module comprises an energy absorbing mechanism comprising a horizontal spring layer and a growth medium comprising a steel grid layer, wherein the horizontal spring layer absorbs vertical forces exerted by external loads, and the steel grid layer is positioned on top of the horizontal spring layer for holding a plurality of turf sods. The hydroponic field irrigation system further comprises a used water tank for receiving water from the field module, an ultraviolet (UV) unit for disinfecting the water received from the used water tank, a water quality management unit for adjusting quality of the water received from the ultra-violet (UV) unit, a geothermal unit for conditioning temperature of water received from the water quality management unit and plurality of solenoid valves for pumping water into and out of the field module.

8 Claims, 1 Drawing Sheet

(56) References Cited

U.S. PATENT DOCUMENTS

| | | | |
|---|---|---|---|
| 6,330,762 B1* | 12/2001 | Puspurs | A01G 13/0281 47/32 |
| 6,739,089 B1* | 5/2004 | Behrens | E04D 11/002 47/56 |
| 7,108,454 B2* | 9/2006 | Blackwood | E01C 13/083 405/36 |
| 7,144,609 B2* | 12/2006 | Reddick | C09K 17/40 428/17 |
| 9,194,136 B2* | 11/2015 | Cormier | E04F 15/225 |
| 9,279,258 B2* | 3/2016 | Cormier | E04F 15/225 |
| 9,528,280 B2* | 12/2016 | Cormier | E04F 15/225 |
| 9,622,425 B2* | 4/2017 | Huang | A01G 9/02 |
| 10,208,434 B2* | 2/2019 | van Raam | E01C 13/02 |
| 2004/0177578 A1* | 9/2004 | Casimaty | A63C 19/00 52/384 |
| 2005/0042394 A1* | 2/2005 | Sawyer | E01C 13/02 428/17 |
| 2011/0146151 A1* | 6/2011 | Janssen | A01G 31/02 47/59 S |
| 2011/0197504 A1* | 8/2011 | Hellwig | B32B 5/022 47/64 |
| 2011/0302836 A1* | 12/2011 | Alberto | A01G 20/20 47/58.1 SC |
| 2012/0321389 A1* | 12/2012 | Kreikemeier | E01C 13/08 405/48 |
| 2015/0359181 A1* | 12/2015 | Yuristy | A01G 31/00 47/59 R |
| 2016/0123021 A1* | 5/2016 | Cormier | B29C 45/14 52/403.1 |
| 2016/0212953 A1* | 7/2016 | Janssen | A01G 27/003 |
| 2016/0273208 A1* | 9/2016 | Dime | E03F 1/005 |

\* cited by examiner

HYDROPONIC TURFGRASS ATHLETIC FIELD AND LANDSCAPE APPARATUS

FIELD OF THE INVENTION

The present invention relates to hydroponic turfgrass irrigation, and more particularly to a hydroponic field irrigation system designed to grow turfgrass, or to simulate natural turf fields.

BACKGROUND OF THE INVENTION

Water scarcity is the lack of sufficient available water resources to meet the demands of water usage within a region. Water use has been growing globally at more than twice the rate of population increase in the last century, and an increasing number of regions are reaching the limit at which water services can be sustainably delivered, especially in arid regions. Water scarcity can be a result of two mechanisms; physical water scarcity and economic water scarcity, where physical water scarcity is a result of inadequate natural water resources to supply a region's demand due to physical shortage, or economic water scarcity is lack of access due to lack of adequate infrastructure to ensure a regular supply. The reduction of water scarcity is a goal of many countries, and the importance of good water management of the sufficient available water resources has been recognised globally.

For this reason, there is an increasing pressure to develop sustainable water management practices. Particularly, the increasing consumption in turf and landscape areas, the dependence on potable water, inefficient irrigation practices and the relatively low use of recycled or greywater for irrigation are some of the issues that need to be addressed.

There are many examples of situations in which water used to irrigate turfgrass fields has been inefficient and waste through poor water management practices. For example, during periods of low precipitation and high temperatures, fields are required to be irrigated four to seven times every week. More specifically, during the 2010 FIFA World Cup that took place in South Africa, 26,417 US gallons of water a day were utilised, which is the equivalent of 100,000 litres. On the other hand, a typical golf course requires 100,000 to 1,000,000 gallons per week to maintain healthy vegetation in the summer period.

This is notably a larger problem in regions with warmer climates, as studies have reported that direct evaporation from sprinklers can account for a 50 percent or greater loss of water in a desert climate. Overall, it's the climate or environment that is the primary consideration for grass selection. The region's average low temperature is often used to determine grasses that are appropriate for the area. Moreover, different environmental factors such as solar radiation, temperature, relative humidity, and wind movement, all result in an increase in evaporation losses from irrigation, in addition to operating pressures, and nozzle diameter.

As a result of the above, importance has been placed upon good irrigation practice and consequently improving turfgrass technology. Artificial turf fields have been developed to reduce management requirements as well as sustainable water usage. With recent advancements in athletic fields and landscape apparatus, turfgrass is a common artificial grass solution for outdoor athletic fields. Turfgrass is usually a high-quality grass made of innovative materials that will provide a quality playing surface, which is appreciated by sports participants and produces a pleasing appearance to spectators. There is a growing emphasis on prevention of water wastage and nutrient solution recycling as it is widely known turfgrass technology is an important field within turfgrass athletic field and landscape apparatus.

Previously, artificial turf-like products have been developed that provide a surface resembling grass, specifically products with characteristics equivalent to those displayed by real turf intended for athletic purposes. Other developments include a drainable turf assembly and a rapidly draining artificial turf assembly for a support surface, such as a playing field. Additionally, other developers and researchers designed a subsurface mat that includes a perforated tube, a web made of a first capillary textile and a casing made of a second capillary textile to irrigate fields and landscape, to prevent irrigation water drift due to wind and heat.

Although artificial turf fields have been a realistic alternative, concerns regarding health and environmental issues have recently increased. High levels of lead have been discovered in a number of "in-use" artificial turf fields of varying ages and types of materials. The lead is mixed within the fibers as a lead chromate paint for bright coloration of the surface, with the surfaces degrading over time due to overuse and weathering. As a result, lead can be released from the older turf material by just wiping the surface with synthetic sweat or extracting from the turf fibers using a synthesis digestive system. In some cases, the amount on wipe exceeds residential guidelines for lead on floor surfaces, that is 40 $\mu g/ft^2$, and it is likely that continued aging of the turf will result in even greater releases. Furthermore, the ease of mobilization would enhance the probability of re-suspension of lead into the breathing zone of athletes and other users, especially young children. The infill rubber crumbles used in this type of fields represents a more complex issue where 24.7-44.2% of the lead in the rubber granules was bio-accessible in the synthetic gastric fluid.

As a result of the above, turf fields have been developed to reduce management requirements, efficient nutrient recycling and sustainable water usage. More recently, hydroponic technology has been introduced which comprises a soil-less plant growing technique. Hydroponic technology is method using nutrient solutions such as chemical fertiliser or manure in a water solvent to grow the plants as a replacement for soil. The roots of terrestrial plants are usually placed within the mineral solution to allow growth. Due to the technological advancements within this industry, it has become a popular choice for turfgrass technology.

Moreover, in countries with a tropical desert climate the major limiting factors in traditional agriculture production is the harsh climate and scarce water resources. Hydroponic technology provides a solution to the regions as it offers the ability to grow anywhere in much higher yields while using a fraction of resources such as land and water. It allows farmers to grow their own crops at their own facility at any scale. In a controlled system, without the need for soil, much less water is required to grow sustainable, year-round crops. For these reasons, efforts towards developments of hydroponics systems are designed specifically for the desert climate to optimize production.

Accordingly, there exists a need for a hydroponic turf design, which provides a sustainable water supply and effectively reduces ecological impact, whilst meeting the requirements of a specific purpose field such as athletic fields.

SUMMARY OF THE INVENTION

Therefore it is an object of the present invention to develop a hydroponic turfgrass irrigation system, to grow turfgrass.

The present invention involves a field module for growing turfgrass, the field module comprising an energy absorbing mechanism comprising a horizontal spring layer and a growth medium comprising a steel grid layer, wherein the horizontal spring layer absorbs vertical forces exerted by external loads, and the steel grid layer is positioned on top of the horizontal spring layer for holding a plurality of turf sods.

In an embodiment of the present invention, the field module further comprises a 25 cm deep container made of fiberglass, galvanized steel or concrete.

In an embodiment of the present invention, the horizontal spring layer is a perforated corrugated sheet made of galvanized steel.

In an embodiment of the present invention, spaces between the perforated corrugated sheet are filled with rockwool which acts as a growth substrate for the turfgrass.

In an embodiment of the present invention, a thickness of the horizontal spring layer is 3 to 4 mm.

In an embodiment of the present invention, the horizontal spring layer is capable of moving horizontally, thereby imitating natural resilience of soil.

In an embodiment of the present invention, the field module further comprises a slidable sheet layer positioned below the horizontal spring layer for assisting the horizontal spring layer to move horizontally.

In an embodiment of the present invention, the slidable sheet layer is made of galvanized steel.

In an embodiment of the present invention, the external loads comprise players, pedestrians or sporting equipment.

As a further aspect of the present invention, there is presented a hydroponic field irrigation system for growing turfgrass, the hydroponic field irrigation system comprising a field module for growing the turfgrass, a used water tank for receiving water from the field module, an ultra-violet (UV) unit for disinfecting the water received from the used water tank, a water quality management unit for adjusting a quality of the water received from the ultra-violet (UV) unit, a geothermal unit for conditioning a temperature of the water received from the water quality management unit and a plurality of solenoid valves for pumping water into and out of the field module.

In an embodiment of the present invention, the plurality of solenoid valves comprise a first solenoid valve and a second solenoid valve.

In an embodiment of the present invention, the first solenoid valve allows fresh water into the field module and the second solenoid valve allows used water out from the field module.

In an embodiment of the present invention, the water quality management unit sustains a pH level and electric conductivity level of the water received from the ultra-violet (UV) unit.

In an embodiment of the present invention, the geothermal unit functions based on day or night or winter or summer cycles for conditioning a temperature of the water received from the water quality management unit.

In an embodiment of the present invention, the field module comprises a horizontal spring layer for absorbing vertical forces exerted by external loads, a steel grid layer positioned on top of the horizontal spring layer for holding a plurality of turf sods; and a slidable sheet layer positioned below the horizontal spring layer for assisting the horizontal spring layer to move horizontally.

In an embodiment of the present invention, the field module further comprises a 25 cm deep container made of fiberglass, galvanized steel or concrete.

In an embodiment of the present invention, the horizontal spring layer is a perforated corrugated sheet made of galvanized steel.

In an embodiment of the present invention, spaces between the perforated corrugated sheet are filled with rockwool which acts as a growth substrate for the turfgrass.

In an embodiment of the present invention, a thickness of the horizontal spring layer is 3 to 4 mm.

In an embodiment of the present invention, the slidable sheet layer is made of galvanized steel.

In an embodiment of the present invention, the external loads comprise players, pedestrians or sporting equipment.

As a further aspect of the present invention, there is presented a process for growing turfgrass using a hydroponic irrigation system, the process comprising the steps of pumping out used water from a field module, through a second solenoid valve, storing the used water in a used water tank, disinfecting the used water received from the used water tank using ultra-violet (UV) rays, adjusting a pH level and electric conductivity level of the disinfected water, using a water quality management unit, conditioning a temperature of the water received from the water quality management unit, using a geothermal unit, pumping the conditioned water received from the geothermal unit into the field module through a first solenoid valve, wherein the field module holds a plurality of turf sods on a grid layer positioned on top of the field module.

In an embodiment of the present invention, the field module further comprises a 25 cm deep container made of fiberglass, galvanized steel or concrete.

In an embodiment of the present invention, the geothermal unit functions based on day or night or winter or summer cycles for conditioning a temperature of the water received from the water quality management unit.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of the hydroponic field module according to the present invention will be described in conjunction with FIGS. 1-2. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The proposed solution aims at designing a field module, which is intended to grow turfgrass through a setup designed with an energy absorbing mechanism and a growth medium. Hydroponic technology is utilized to circulate used water thereby improving water use efficiency, in addition to eliminating ground water contamination. This present invention also aims at improving water management systems, with an objective to develop a soil-less athletic field module which mimics typical grass fields.

More specifically, the present invention resolves the use of irrigating fields with high pressure sprinkler irrigation systems and applying granular or liquid chemicals as a source of nutrients, which have been the cause of high water losses due to wind drift or evaporation, particularly in hot regions. All of the above-mentioned methods consume large amounts of energy, and thus there is a need for a system that consumes less energy compared to typical high pressure irrigation systems. The previously used methods further contribute to environmental problems, as they are also the primary source of ground water contamination, since drained water loaded with fertilizers infiltrates through soil layers. The field module of the present invention provides a solution to protect ground water from fertilisers and chemical contamination, by containing the whole system in a metallic or concrete bin, termed as a field module, and keeping the nutrient solution away from soil.

Figure 1:
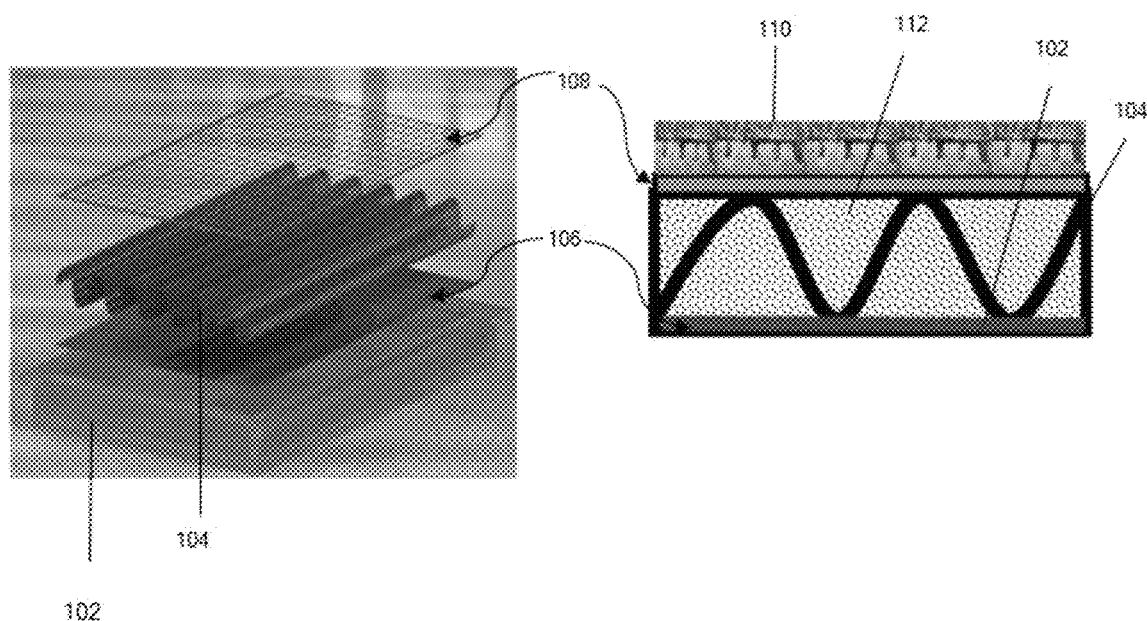
FIG. 1 illustrates a field module in accordance with the present invention.

In accordance with the present invention, the proposed field module design (as illustrated in FIG. 1) has a flexibility to be used both indoors and outdoors. Hydroponic technology, which is a subset of hydro-culture, is the chosen method for growing plants in this invention, using mineral nutrient solution in water, without the need of soil. There are many variations of this specific technology, and as specified, the concept uses a soil-less cultivation method to grow turfgrass in a specialty designed setup. The advantages offered by hydroponic technology enable the field module to be extremely versatile, having many uses and applications.

In accordance with an embodiment of the present invention, the field module 202 comprises a plurality of layers, each encompassing a different but relevant function. A first layer comprises a 25 cm deep container 102 which may have a thickness of 23-25 cm. This container is made of metal, fibreglass, galvanized steel, or constructed using prefabricated concrete in a full-scale level. This container 102 further accommodates a second layer, which is the horizontal spring layer. The horizontal spring layer is made of a 3-4 mm thick perforated corrugated galvanized steel sheet 104. These perforated steel sheets 104 have a horizontal spring-like mechanism, which aids to absorb vertical forces exerted by external loads, like players, pedestrians or sporting equipment which include, but are not limited to, balls, bats, sticks, etc. These perforated steel sheets 104 further possess a feature of being capable of extending slightly sidewise or moving horizontally from a left position to a right position and vice versa, thus guaranteeing safety of players and imitating natural resilience of soil. Furthermore, the perforations within the perforated steel sheets 104 assist in fluid dynamics as they allow the flow of water from a downward direction to an upward direction, in addition to allowing plants to extend their roots to the depth of the container 102, in search for more water and nutrients.

In accordance with another embodiment the present invention, the field module further comprises a third layer which is a slidable sheet 106 made of galvanized steel. The slidable sheet 106 enables the horizontal spring layer to slide above it without corroding the bottom of the container 102. The advantage of this layer is that it can be easily replaced once it is exhausted, whilst protecting the container 102. In addition the field module also comprises a fourth layer which is a grid layer 108, made of galvanized steel grid sheet. The purpose of this grid layer 108 is to carry or hold turf sods and to rest on the horizontal spring layer.

The space above and below the horizontal spring layer is filled with rockwool 112 which acts as a growth substrate. Turf sods 110 are laid on the top of the grid layer 108, which is then covered with a thin nylon net. Turf sods 110 are specially grown using a jute pouch stuffed with rockwool 112 to grow turf grass in a strong media where it can serve in the turf module, yet has a high water holding capacity to accommodate enough water to the roots. All metallic parts of the system are preferably made of galvanized steel to guarantee durability and cost effectiveness.

In accordance with the present invention, the design of the field module comprises an upper grid 108 wherein the turf sods 110 are laid on the top of the whole field module in a 25 cm deep container 102 equipped with a horizontal spring-like mechanism made of perforated steel sheets 104. The field module comprises of multiple layers, including layers of rockwool 112, which act as a growth media to quilt the spring mechanism to accommodate the grass roots and to sustain the nutrient solution for its survival. As a smart solution to artificial grass fields, this present system has the ability to eliminate the use of potentially harmful pesticides and fertilizers, whilst also conserving water resources. Nonetheless, it is also important for turfgrass facilities to deliver as effective sporting fields to assure performance parameters such as efficient movement of sports equipment i.e. bouncing of balls, as well as the safety of players.

The present invention aims to achieve these performance parameters as the resilience of the field module surface, resulted by the combination of the spring layer, the water soaked rockwool 112 and turf sods 110, reproduces that of soil based field facilities. As a result of the above, this system results in a athletic/sports field with an acceptable resilience to prevent player injuries whilst maintaining an environmentally sustainable system, imitating the resilience of natural grass fields.

Figure 2:
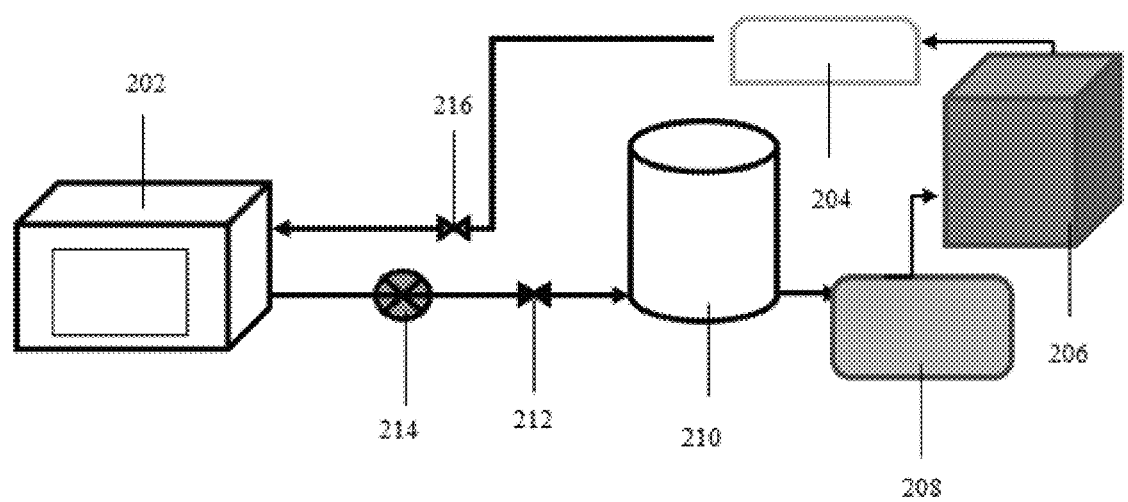
FIG. 2 depicts a hydroponic irrigation system in accordance with the present invention.

In accordance with an embodiment of the present invention, and as denoted in FIG. 2, there is presented a system layout for receiving nutrient solution from a hydroponic unit, and to circulate and adjust the circulated water quality. Accordingly, a generic water quality management unit 206, a geothermal unit 204, and an ultra-violet (UV) unit 208 are main components of the presented system layout which facilitates efficient water recycling within the field module 202. Fresh water enriched with nutrients is pumped through a first solenoid valve 216, to fill the field module 202. Once the field module 202 is full, first solenoid valve 216 and second solenoid valve 212 remain closed for some time in order to allow the rockwool to absorb the fresh water enriched with nutrients. Then, the second solenoid valve 212 opens and the pump or pressure switch 214 starts to return the used water to the used water tank 210. During the next cycle, the used water is adjusted by the water quality management unit 206 to sustain its pH (Acidity) and Electric Conductivity levels by adding fresh water and/or more nutrients to be pumped again into the field module 202. Hence, the role of the generic water quality management unit 206 is to adjust the water quality and to further enrich the water with nutrients.

Additionally, the field module 202 is connected with a geothermal unit 204, which comprises a heat exchanger (not shown) located 2.5 to 3 meter deep in the soil in order to warm or cool the water before pumping it to the field module 202 where the difference between ambient air and deep soil temperature may reach up to ±10° C., in accordance to day/night or winter/summer cycle. Thus, as a result of this, the turf will be able to tolerate extreme temperatures. Moreover, altering water temperature will allow turf managers to control growth rate of the grass, consequently reducing turf cutting costs. The field module 202 further comprises a ultra-violet (UV) unit 208 that enables circulated water to be disinfected in the process. The objective of this UV unit 208 is to kill majority of the germs accumulated in the system from the outdoor environment.

In accordance with another embodiment of the present invention, a control system (not shown) is utilized to monitor the chemical and physical properties of water, in addition to its levels or consumption. The controller is programmed to actuate the solenoid valves 212 and 216, to activate flood/drain cycles according to a root zone moisture availability and the surrounding environment. The control system employs an Arduino microcontroller and a group of compatible sensors.

The present invention provides the parameters necessary for maintaining turfgrass for multiple purposes in dry and hot regions such as UAE and all GCC countries, as the ambient temperature in such areas is too high and as a result, the rate of evaporation increases whilst irrigating. Furthermore, due to the versatility of this system it is applicable as an outdoor turfgrass installation system due to the incorporated geothermal unit 204 that will enable the system to function in extreme hot or cold environments, as the temperature of the circulated water can be adjusted to help grass to survive the harsh conditions. Likewise, controlling the water temperature with the geothermal unit 204 in cold environments will also preserve grass quality. Furthermore, the proposed field module 202 aids in controlling grass height in all environments by water quality and nutrient solution composition, consequently reducing the use of labour intensive mowers in the fields.

Additionally, due to the nature of this system, the field module can also be applied to smart cities such as Masdar city in Abu Dhabi, a city reliant on solar energy and other renewable energy sources, as well as ultramodern floating cities, where there is no soil availability and fresh water resources are limited. Operating towards the principles of sustainable development, such systems also permits green cities to meet their 'green' goals. As a system capable of being used in both indoor and outdoor facilities, it provides many advantages due to its adaptability. For example, the system can be installed temporarily for short term events and transported easily to/from different locations. As well as its convenience in mobility, the hydroponic field module can be applied to situations where natural plant cover is usually difficult to attain. For example, on the deck of cruises or on the top of towers, providing travellers or residents natural plant cover instead of synthetic cover.

In accordance with another embodiment of the present invention, the health hazards posed by indoor contaminants may be problematic and many different factors are contributing to indoor biotic pollution. Soil may act as a reservoir of fungi and are a source of biological infestation, for this reason, this hydroponic field module can be an alternative, soil-less system used in indoor facilities where biological infestation has been a prior problem. Similarly, this hydroponic system provides a natural grass solution for children, avoiding health risks imposed by the plastic artificial turf playgrounds.

It is apparent that the present invention provides an excellent water saving technique to grow landscape spaces with minimum water, using a nutrient solution recycling system. During this efficient process, this soil-less turfgrass system eliminates soil and ground water pollution. As a sustainable system that works efficiently to save water resources, it also has the capacity to efficiently work under flooding rains, as excessive water is pumped, ensuring the field is still usable. Under flooding rains, the system still functioning where it can accommodate excessive water and as a result of this avoid event cancellations or turfgrass damage.

In accordance with a preferable embodiment of the present invention, the different components within the field module have their own functionalities that assist in reducing the ecological impact of athletic fields and enhance sustainability by reducing water footprint (particularly in the sports industry), in addition to eliminating soil/ground water pollution.

In accordance with an embodiment of the present invention, manufacturing and installing the hydroponic turfgrass system is achieved cost efficiently, and thus presents few difficulties to fabricate and install in temporary arenas.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A field module for growing turfgrass, the field module comprising:
   a container;
   a horizontal spring layer positioned within the container made of a perforated and corrugated sheet,
   a third layer comprising a slidable sheet for enabling the horizontal spring layer to slide without corroding a bottom of the container, and
   a fourth layer or growth medium comprising a steel grid layer positioned on top of the horizontal spring layer, for accommodating a plurality of turf sods and a growth substrate for sustaining a nutrient solution for growth and survival of the plurality of turf sods;
   wherein the horizontal spring layer absorbs vertical forces exerted by external loads and moves horizontally from a left position to a right position and from the right position to the left position, thereby imitating natural resilience of soil; and
   wherein perforations of the horizontal spring layer assist in fluid dynamics by allowing flow of water, and allow for the plurality of turf sods to extend roots to the bottom of the container in search of the nutrient solution.

2. The field module of claim 1, wherein the field module further comprises a 25 cm deep container made of metal, fiberglass, galvanized steel or concrete.

3. The field module of claim 1, wherein the perforated and corrugated sheet is made of galvanized steel.

4. The field module of claim 3, wherein spaces between the perforated corrugated sheet are filled with rockwool which acts as the growth substrate for the turfgrass.

5. The field module of claim 3, wherein a thickness of the horizontal spring layer is 3 to 4 mm.

6. The field module of claim 1, wherein the slidable sheet layer is positioned below the horizontal spring layer for assisting the horizontal spring layer to move or slide horizontally.

7. The field module of claim 6, wherein the slidable sheet layer is made of galvanized steel.

8. The field module of claim 1, the external loads comprise sporting equipment.

\* \* \* \* \*